United States Patent
Darley et al.

[11] Patent Number: 6,122,340
[45] Date of Patent: Sep. 19, 2000

[54] DETACHABLE FOOT MOUNT FOR ELECTRONIC DEVICE

[75] Inventors: Jesse Darley, Watertown; Paul J. Gaudet, Tewksbury; Sam Joffe, Cambridge; Norbert Ohlenbusch, North Billerica; John Costello, Wellesley; Mark Bates, Westwood; Thomas Blackadar, Natick, all of Mass.

[73] Assignee: Personal Electronic Devices, Inc., Wellesley Hills, Mass.

[21] Appl. No.: 09/164,654

[22] Filed: Oct. 1, 1998

[51] Int. Cl.$^7$ .................................................. G01C 21/00
[52] U.S. Cl. ............................................. 377/24.2; 377/23
[58] Field of Search ................................ 377/23, 24.2, 19

[56] References Cited

U.S. PATENT DOCUMENTS

| | | | |
|---|---|---|---|
| 3,974,491 | 8/1976 | Sipe | 340/272 |
| 4,578,769 | 3/1986 | Frederick | 364/565 |
| 4,649,552 | 3/1987 | Yakawa | 377/24 |
| 4,651,446 | 3/1987 | Yulawa et al. | 364/566 |
| 4,745,564 | 5/1988 | Tennes et al. | 364/566 |
| 4,771,394 | 9/1988 | Cavanagh | 364/561 |
| 4,814,661 | 3/1989 | Ratzlaff et al. | 310/328 |
| 4,817,306 | 4/1989 | Bayer | 36/136 |
| 5,033,013 | 7/1991 | Kato et al. | 364/561 |
| 5,269,081 | 12/1993 | Gray | 36/136 |
| 5,285,586 | 2/1994 | Goldston et al. | 36/137 |
| 5,311,679 | 5/1994 | Birch, Sr. | 36/136 |
| 5,313,719 | 5/1994 | Koethe | 36/72 R |
| 5,323,650 | 6/1994 | Fullen et al. | 73/172 |
| 5,343,445 | 8/1994 | Cherdak | 368/10 |
| 5,357,696 | 10/1994 | Gray et al. | 36/136 |
| 5,361,778 | 11/1994 | Seitz | 128/779 |
| 5,437,289 | 8/1995 | Liverance et al. | 128/779 |
| 5,485,402 | 1/1996 | Smith et al. | 364/566 |
| 5,502,903 | 4/1996 | Mathis et al. | 36/137 |
| 5,566,477 | 10/1996 | Barker | 36/100 |
| 5,596,821 | 1/1997 | Solo | 36/136 |
| 5,636,146 | 6/1997 | Flentov et al. | 364/569 |
| 5,664,346 | 9/1997 | Barker | 36/137 |
| 5,673,501 | 10/1997 | Mathews | 36/136 |
| 5,720,200 | 2/1998 | Anderson et al. | 73/172 |
| 5,724,265 | 3/1998 | Hutchings | 364/410 |
| 5,728,032 | 3/1998 | Glass | 482/105 |
| 5,955,667 | 9/1999 | Fyfe | 73/490 |

*Primary Examiner*—Margaret R. Wambach
*Attorney, Agent, or Firm*—Wolf, Greenfield & Sacks, P.C.

[57] ABSTRACT

In one embodiment, an apparatus for monitoring locomotion of a person that can be secured to the person's shoe includes a mounting unit, a housing unit, and a motion-sensing device. The mounting unit is adapted to be secured to an outer surface of the shoe. The housing unit is adapted to releasably attach to the mounting unit. The motion-sensing device is attached to the housing unit such that, when the housing unit is detached from the mounting unit, the motion-sensing device remains attached to the housing unit. In another embodiment, a motion-sensing apparatus includes a circuit board and an accelerometer. The accelerometer has an acceleration-sensing axis, and is mounted on the circuit board such that the acceleration-sensing axis is oriented at an acute angle with respect to a surface of the circuit board. In yet another embodiment, a motion-sensing apparatus includes a housing unit and an accelerometer. The housing unit is adapted to be secured to an instep portion of a shoe. The accelerometer is supported by the housing unit such that, when the housing unit is secured to the instep portion of the shoe, an acceleration-sensing axis of the accelerometer is oriented to be substantially parallel to a bottom surface of the shoe or substantially perpendicular to the bottom surface of the shoe.

16 Claims, 8 Drawing Sheets

DETACHABLE FOOT MOUNT FOR ELECTRONIC DEVICE

BACKGROUND OF THE INVENTION

Electronic devices for monitoring the locomotion (e.g., walking, jogging, or running) of people are known in the art. Most commonly, one or more impact-sensitive sensors, e.g., contact switches, piezoelectric sensors, etc., are placed in a sole of a shoe to sense when the shoe comes into contact with and/or leaves the ground. Typically, such sensors are embedded in the heel and/or toe portion(s) of the shoe's sole, and outputs thereof are fed to a processor or other electronic device.

In a device disclosed in U.S. Pat. No. 4,649,552 ("the '552 device"), for example, a contact switch is fixed to the undersurface of a removable insole of a shoe, such that each footstep of the person wearing the shoe causes the contact switch to close. In the '552 device, the two leads of the contact switch are fed (via a cable) to a mount base including a pair of electrical terminals, with a respective terminal being connected to each lead. In addition, an electronic counter is detachably mounted to the mount base such that, when mated together, a pair of terminals on the electronic counter electrically contact the pair of terminals on the mount base, so that the counter can count the number of footsteps the user takes by counting the number of times the contact switch closes.

It is also known to secure a sensor to the instep portion of a shoe to sense when the shoe flexes during footsteps of a person wearing the shoe. In a device disclosed in U.S. Pat. No. 4,651,446 ("the '446 device"), for example, the two leads from an instep-mounted contact switch (which is closed when a person's shoe flexes during footsteps) are fed to a mount base including a pair of electrical terminals, with one lead being connected to each terminal. As with the '552 device, the '446 device includes an electronic counter which is detachably mounted to the mount base such that, when mated together, a pair of terminals on the electronic counter electrically contact the pair of terminals on the mount base, so that the electronic counter may count the number of times the instep-mounted contact switch closes when the user's foot flexes, thereby counting the number of footsteps taken by the user.

SUMMARY OF THE INVENTION

According to one aspect of the present invention, an apparatus for monitoring locomotion of a person that can be secured to the person's shoe includes a mounting unit, a housing unit, and a motion-sensing device. The mounting unit is adapted to be secured to an outer surface of the shoe. The housing unit is adapted to releasably attach to the mounting unit. The motion-sensing device is attached to the housing unit such that, when the housing unit is detached from the mounting unit, the motion-sensing device remains attached to the housing unit.

According to another aspect of the invention, a motion-sensing apparatus includes a circuit board and an accelerometer. The accelerometer has an acceleration-sensing axis, and is mounted on the circuit board such that the acceleration-sensing axis is oriented at an acute angle with respect to a surface of the circuit board.

According to yet another aspect, a motion-sensing apparatus includes a housing unit and an accelerometer. The housing unit is adapted to be secured to an instep portion of a shoe. The accelerometer is supported by the housing unit such that, when the housing unit is secured to the instep portion of the shoe, an acceleration-sensing axis of the accelerometer is oriented to be substantially parallel to a bottom surface of the shoe or substantially perpendicular to the bottom surface of the shoe.

According to another aspect of the present invention, a method for mounting a motion-sensing device to a person's shoe involves a step of securing a mounting unit to an outer surface of the shoe. The method further involves a step of attaching a housing unit, having a motion-sensing device attached thereto, to the mounting unit, and a step of detaching the housing unit from the mounting unit without detaching the motion-sensing device from the housing unit.

According to another aspect, a method for mounting an accelerometer on a circuit board involves a step of mounting the accelerometer on the circuit board such that an acceleration-sensing axis of the accelerometer is oriented at an acute angle with respect to a surface of the circuit board.

According to yet another aspect, a method for sensing acceleration of a shoe involves a step of securing a housing unit to an instep portion of the shoe. The method also involves a step of using an accelerometer to measure acceleration in a direction that is substantially parallel to a bottom surface of the shoe or substantially perpendicular to the bottom surface of the shoe.

DETAILED DESCRIPTION OF THE INVENTION

Figure 1:
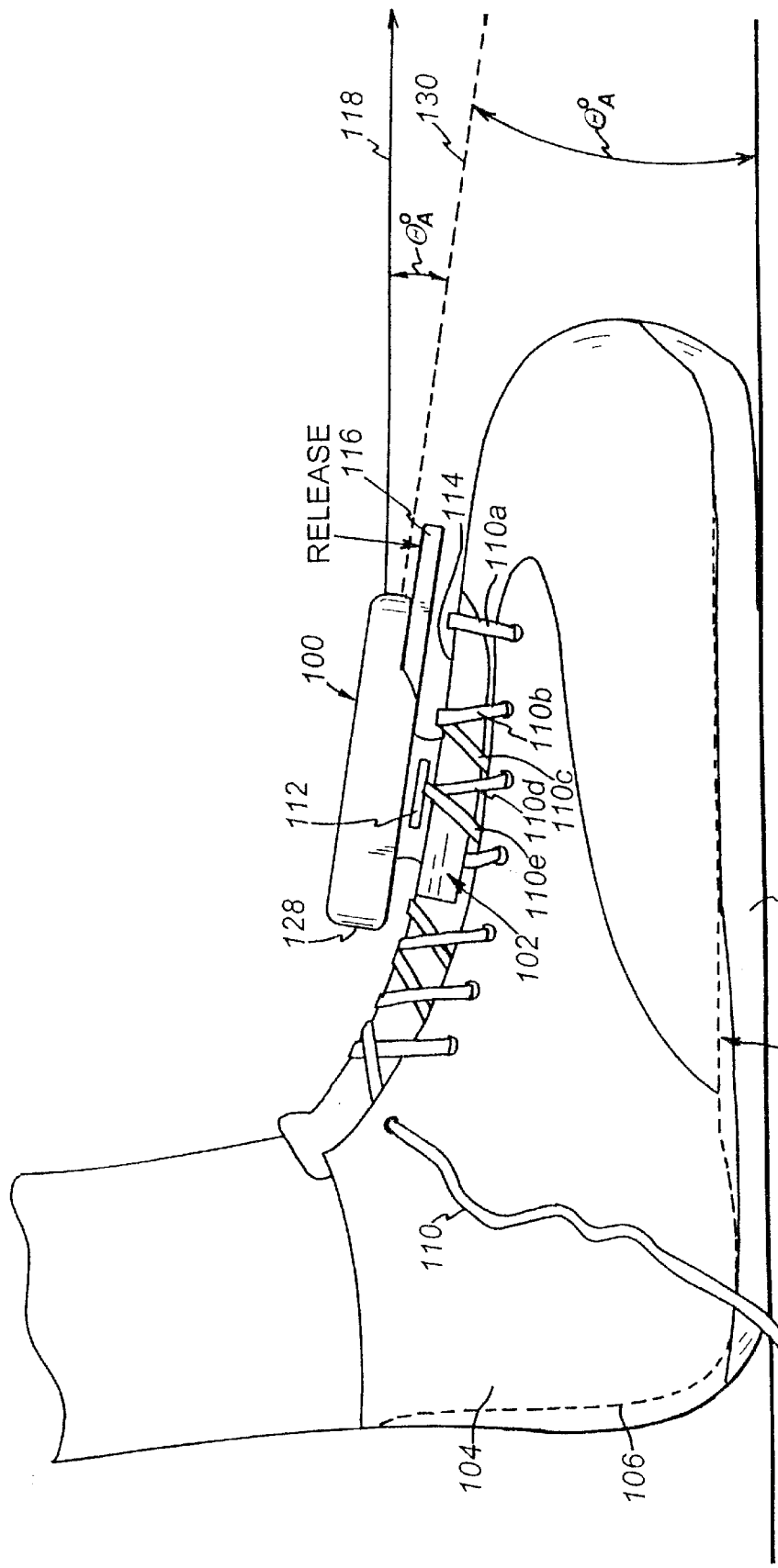
FIG. 1 is an illustration showing an example of how an electronic device may be mounted to a shoe of the user according to one embodiment of the present invention.

In each of the '552 and '446 devices described above in which an electronic counter is detachably mounted to a mount base, it is necessary that the physical connections between the pair of terminals on the mount base and the pair of terminals on the electronic counter be complete and constant in order for the electronic counter to accurately count footsteps. Applicants have recognized that the extreme physical forces on a person's foot during locomotion can cause the integrity of the physical contact between the pairs of terminals to lessen such that the connections between the terminals can become loose, intermittent, or incomplete. If the connections between the terminals become loose, extra footsteps may be counted when the terminals bounce against one another during periods that the contact switch is closed.

If the connections between the terminals become intermittent or incomplete, some or all of the footsteps of the user may not be counted by electronic counter.

Additionally, in each of the '552 and 446 devices, the sensor is permanently connected to the mount base and remains secured to the shoe when the electronic counter is detached from the mount base. Therefore, a person may find it necessary to remove both the electronic counter and the mount base from his or her shoe before exercising in adverse weather conditions (e.g., rain or snow) or washing the shoe so as to prevent the sensor or associated circuitry from becoming damaged or rusting.

Further, the requirement that a sensor be connected to the mount base can increase the cost of manufacturing and retail price of the mount base, thereby prohibiting consumers from buying a separate mount base for each of several shoes. Therefore, to use the housing unit with different shoes, a person is required to transfer the mount base from one shoe to another, which can be inconvenient and time consuming.

In one embodiment of the present invention, a mounting unit (which may be relatively inexpensive to manufacture) is adapted to be secured to a shoe (e.g., on the shoelace or elsewhere on the shoe), and a housing unit is releasably attached to the mounting unit. A motion-sensing device, which is used to monitor a parameter associated with the locomotion of a person, may be attached to or housed by the housing unit such that the motion-sensing device is separated from the mounting unit and the shoe when the housing unit is separated from the mounting unit. By associating the motion-sensing device with the housing unit in this manner, no physical connections are required to be made between terminals on the mounting unit and terminals on the housing unit each time the housing unit is releasably attached to the mounting unit, thereby eliminating the risk that the physical forces on the shoe will cause the physical connections between such terminals to become loose, intermittent, or incomplete. Additionally, in such an embodiment, the risk that the motion-sensing device will be damaged due to washing, adverse weather conditions, etc., is eliminated simply by detaching the housing unit from the mounting unit so that the motion-sensing device is separated from the shoe. Further, because the mounting unit is not required to have a motion-sensing device attached to it, the mounting unit can be manufactured relatively inexpensively and sold at a reasonable cost. Therefore, a consumer may purchase several mounting units and secure a respective mounting unit to each of several shoes, so that a single housing unit may be readily transferred to any one of the respective mounting units.

In one embodiment, the housing unit may be entirely self-contained, with all of the electrical components that operate in connection with the motion-sensing device to monitor a parameter associated with the locomotion of the person, except being housed by the housing unit for components such as a wrist-mounted display, etc., to which information may be transmitted via a wireless communication link.

In each of the '552 and '446 devices described above in which an electronic counter is detachably mounted to a mount base, the sensor requires some sort of external physical force (e.g., a compression or bending force) to be exerted on it in order to sense motion, and can become worn or damaged over time as a result of this physical force. U.S. Pat. No. 5,485,402 discloses the use of a motion-sensing device that does not require external physical forces thereon to sense motion (i.e., an electronic accelerometer) to monitor foot strikes of a person. This accelerometer is mounted in a housing which is strapped to the person's ankle so as to generate a signal indicative of the acceleration of the ankle. Because it is not subjected to external physical forces, this accelerometer is less likely to become damaged than are pressure-sensitive switches, etc. The ankle-mounted nature of the housing, however, can be uncomfortable for wearers who exercise vigorously, e.g., joggers and runners. For example, when an ankle-mounted device is tightened sufficiently to remain in place during jogging or running, blood flow to the wearer's foot can become restricted. Also, when worn during strenuous exercise, the straps used to secure such a device to a person's ankle tend to accumulate perspiration, and therefore can develop an unpleasant odor over time.

In one embodiment of the invention, an electronic device including a motion-sensing device that does not require external physical forces thereon to sense motion (e.g., a solid-state accelerometer) is secured to a person's shoe, rather than the person's ankle, so as to overcome the disadvantages of the ankle-mounted device described above. In one embodiment, the motion-sensing device is included in a housing unit which is secured to the instep portion of the person's shoe. The housing unit may be releasably attached to a mounting unit, and the mounting unit may be secured to the shoe, e.g., using a shoelace of the shoe, so that the housing unit may be readily separated from the mounting unit and the shoe. When an accelerometer is used as the motion-sensing device, the accelerometer may be oriented within the housing unit such that an acceleration-sensing axis of the accelerometer is oriented perpendicular to or parallel with the ground, even though the housing unit is secured to a portion of the shoe that is not oriented perpendicular to or parallel with the ground, e.g., on the instep of the shoe. In one embodiment, this orientation of the acceleration-sensing axis of the accelerometer is accomplished by mounting the accelerometer on a circuit board such that an acceleration-sensing axis of the accelerometer forms an acute angle with a plane of the circuit board.

FIG. 1 shows a shoe-mount device (attached to a shoe) according to one embodiment of the present invention. As shown, the shoe-mount device may include two separable portions: a housing unit 100, and a mounting unit 102. In the FIG. 1 embodiment, the mounting unit 102 is secured to an instep portion of an athletic shoe 104 using exposed portions 110*a–e* of a shoe lace 110. It should be appreciated, however, that the shoe with which the present invention is employed may be any of numerous types of shoes, and the invention is not limited to a device adapted for use with any particular type of shoe. For example, the mounting unit 102 may alternatively be adapted for use with a boot, a sandal, a sneaker, a dress shoe, etc. With shoes that employ one or more straps which are fastened, for example, using buckles or hook and loop fasteners in lieu of or in addition to a shoelace, the mounting unit 102 may be adapted to be secured to the shoe's strap(s) instead of the shoelace 110.

It should also be appreciated that the mounting unit 102 may be secured to the shoe 104 at any of numerous locations, and may take on any of numerous forms so as to permit it to be secured properly to the shoe. The invention is not limited to a mounting device 102 that is adapted to be secured to any particular location on the shoe. The mounting device 102 may, for example, be adapted to be secured to a side or back portion of the shoe 104, rather than to the shoe's instep.

In the illustrative embodiment shown in FIG. 1 (in which the mounting unit 102 is secured to an instep portion of the shoe 104), the mounting unit 102 includes an opening 112 through which the portions 110d and 110e of the shoelace 110 may pass, and includes an attachment member 114 that may be inserted underneath the shoelace portions 110a–c. The tension of the shoelace portions 110a–c across a top surface of the attachment member 114 serves to secure a bottom surface of the attachment member 114 to the instep portion of the shoe. In embodiments in which a shoelace or strap is used to secure the mounting unit 102 to the shoe 104, any number of openings and/or attachment members may be provided in or on the mounting unit 102 to permit shoelace or strap portions to secure it to the shoe, and the invention is not limited to the use of any particular types or number of openings and/or attachment members. In one alternative embodiment, for example, a mounting unit 102 is employed that includes a pair of attachment members that can be moved (e.g., folded or slid) with respect to each other such that both members can be slid underneath one or more exposed portions of the shoelace 110 to secure the mounting unit 102 to the instep of the shoe 104. In some embodiments, the mounting unit 102 may also include gripping members that affirmatively clamp the mounting unit 102 onto portions of the shoelace 110.

In alternative embodiments of the invention, the mounting unit 102 may be secured to the shoe 104 without the use of the shoelace 110 or one or more straps. Such embodiments may be used, for example, with shoes that are merely slipped onto the foot and do not employ shoelaces or straps. In one embodiment, for example, an adhesive substance may be used to secure the mounting unit 102 to a side or back portion of the shoe 104, or the mounting unit 102 may be sewn to or embedded in a portion of the shoe to secure it thereto. In another embodiment, the mounting unit 102 may be secured to the shoe 104 using one or more laces or straps (other than the shoelace 110) that may be attached in some fashion to the shoe 104. For example, a lace or strap secured to the mounting device 102 may pass through one or more grommets embedded in a portion of the shoe to secure the mounting unit 102 thereto.

The mounting unit 102 may be made of any of numerous types of materials, and the invention is not limited to any particular type of material. In the embodiment shown in FIG. 1, for example, the mounting unit 102 may be made of a semi-rigid polymer-based or metal material. In alternative embodiments, the mounting unit 102 may be made of a cloth material (e.g., a cloth pouch) that is sewn to or otherwise attached to the shoe 104. In one embodiment, the mounting unit may include the loop portion of a hook and loop fastener, with the housing unit including the hook portion, or vice-versa.

In the embodiment of the invention shown in FIG. 1, the housing unit 100 is releasably attached to the mounting unit 102. The releasable interface between the housing unit 100 and the mounting unit 102 may be accomplished in any of numerous ways, and the invention is not limited to any particular attachment technique. It is important only that the housing unit 100 be attachable to the mounting unit 102 such that, when attached together, the user can manipulate some sort of quick-release mechanism located on the housing unit 100 and/or the mounting unit 102 that permits the housing unit 100 to be separated from the mounting unit 102. In alternative embodiments, for example, one or more clips, straps, strings, pins, levers, hook and loop fasteners, etc., may be used to secure the housing unit 100 to the mounting unit 102 such that the housing unit 100 may be readily disengaged from the mounting unit 102.

As will be discussed in more detail below, in the FIG. 1 embodiment, the user may detach the housing unit 100 from the mounting unit 102 by pressing a cantilever 116 of the mounting unit 102 towards the attachment member 114 of the mounting unit 102 to permit a back end 128 of the housing unit 100 to be slid towards an ankle of the user and away from the mounting unit 102.

Any of numerous electronic devices that monitor the locomotion of a person may be included in the housing unit 100, and the invention is not limited to any particular type of device. In one embodiment, for example, an accelerometer-based device that senses acceleration of the shoe 104 to analyze locomotion of the user is included in the housing unit 100. An example of such an accelerometer-based device is described in co-pending patent application Ser. No. 08/942,802, which is assigned to the assignee of the present invention, and which is incorporated herein by reference in its entirety.

In some embodiments, the housing unit 100 may include only a motion-sensing device, a transmitter, and a power source (if necessary), and may transmit a signal (e.g., via a radio-frequency (RF) or other wireless communications link) from the motion-sensing device in the housing unit 100 to a receiving unit remote from the housing unit 100. In other embodiments, the housing unit 100 may include additional circuitry, such as an amplifier, filter, and processor, which may process an output signal from a motion-sensing device, perform calculations based on this processed output signal, and transmit a signal to a receiving unit (e.g., using a wireless communications link) indicating results of such calculations. A receiving unit used in connection with such embodiments may, for example, process and analyze the signal received from the circuitry in the housing unit 100 to extract information therefrom and/or may perform calculations based thereon. Such a receiving unit may be located, for example, in a wrist-mounted housing, and may include a processor to process and analyze the signal received from the circuitry in the housing unit 100.

In one embodiment, the circuitry in the housing unit 100 includes a solid state accelerometer that is used to measure moments that a foot of a person leaves and comes into contact with the ground, and includes a processor that receives an output signal from the accelerometer, determines an average foot contact time of the person wearing the device based on the output signal, and calculates a pace of the person wearing the device based on the determined foot contact time. In one embodiment, a signal, indicative of the calculated pace of the person, is transmitted by circuitry in the housing unit 100 to a receiver located in a wrist-mounted device positioned on the wrist of the person wearing the foot-mounted device. Circuitry in the wrist-mounted device may receive this signal from the circuitry in the housing unit 100, and display the calculated pace of the person on a display located on the wrist-mounted device (e.g., a light crystal display (LCD)).

As shown in FIG. 1, in one embodiment of the invention, an accelerometer is mounted within the housing unit 100 such that an acceleration-sensing axis 118 of the accelerometer is substantially parallel to the ground when a bottom surface of the shoe 104 is flat on the ground. This orientation of the acceleration-sensing axis 118 with respect to the ground has been found to be particularly advantageous in determining both the moment that the foot leaves the ground and the moment that the foot comes in contact with the ground. To orient the acceleration-sensing axis 118 as shown in FIG. 1, an accelerometer may be mounted within the housing unit 100 such that the acceleration-sensing axis 118 is at an angle $\theta_a$ with respect to a plane of the housing unit 100 (which plane is indicated by the dashed line 130).

Examples of how an accelerometer may be mounted within the housing unit 100 to orient the acceleration axis 118 as shown in FIG. 1 are described in detail below in connection with FIG. 7.

In the FIG. 1 embodiment, the foot-mount device comprising the housing unit 100 and the mounting unit 102 is located above a bottom surface 108 of the user's foot. Also, in the embodiment shown, the housing unit 104 is self-contained such that, in order to monitor the locomotion of the user, circuitry in the housing unit 100 is not required to interface with any circuitry located within the mounting unit 102, the sole 120, or elsewhere in or on the shoe 104. It should be appreciated, however, that the housing unit 100, while being self-contained, may interface with other components, e.g., a wrist-mounted display, via a wireless communication link.

Because, in the FIG. 1 embodiment, a solid-state accelerometer may be employed (in the housing unit 100) to sense motion of the shoe 104, no devices that require external physical forces on them to sense motion (e.g., pressure-sensitive switches or piezoelectric sensors) need to be employed in connection with the FIG. 1 embodiment. Therefore, no components need to be employed that may be damaged due to the forceful impacts of foot strikes.

Figure 2:
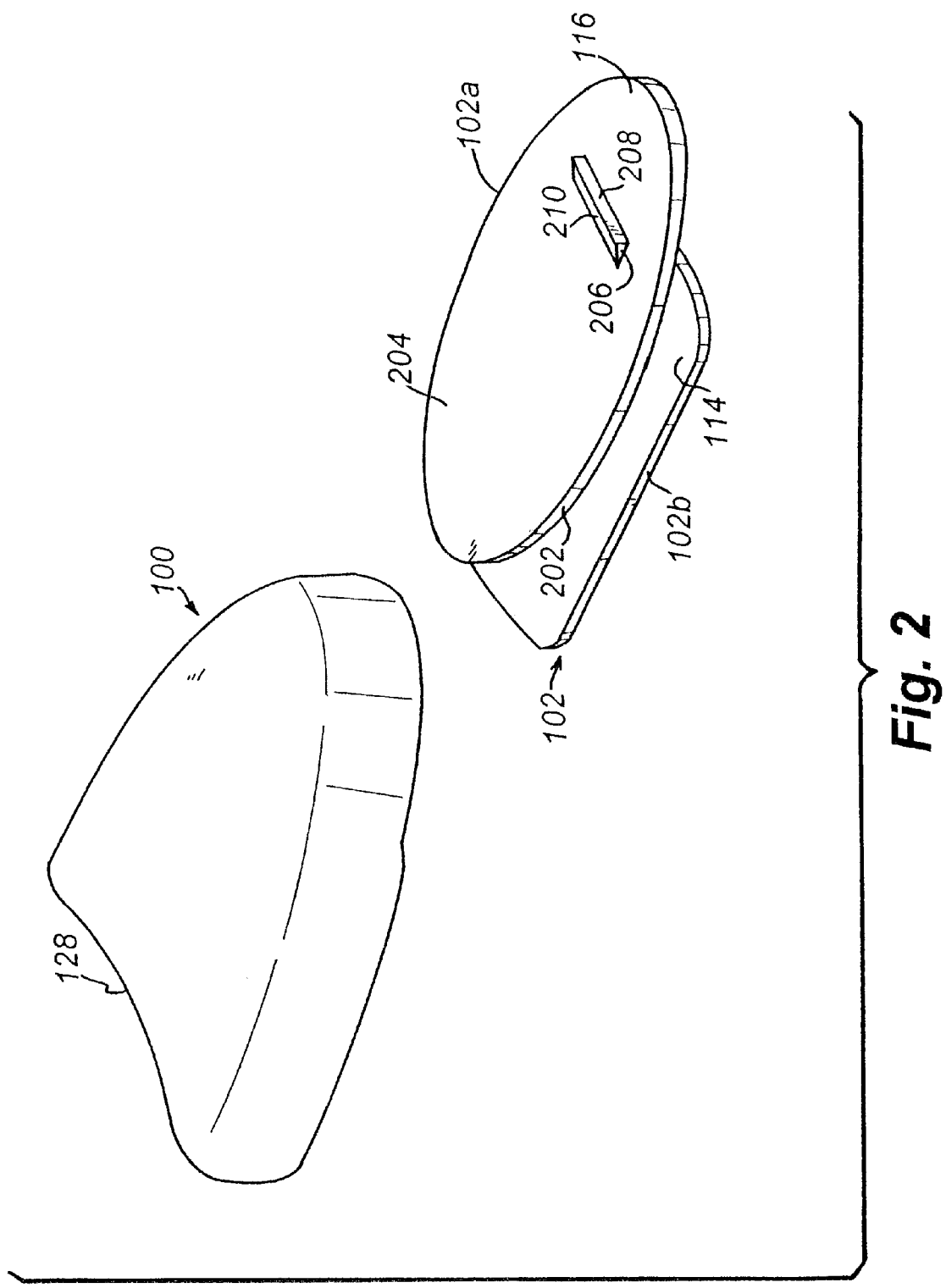
FIGS. 2 and 3 show perspective views of separate units that may be used to support an electronic device with respect to a shoe according to an embodiment of the invention.
Figure 3:
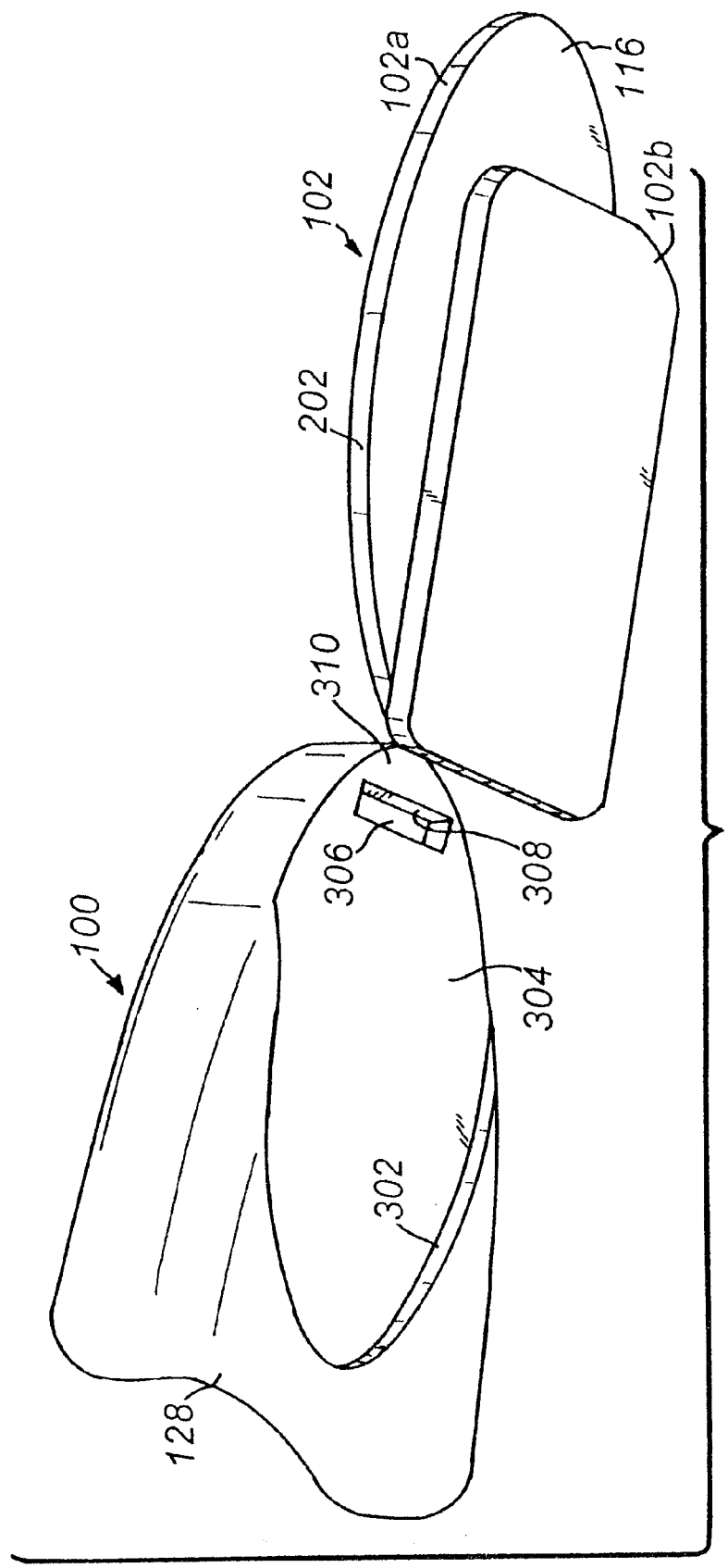

FIGS. 2 and 3 show top and bottom perspective views, respectively, of one embodiment of a shoe-mount device (such as that shown in FIG. 1) when the housing unit 100 and the mounting unit 102 are separate from one another. As shown in FIGS. 2 and 3, the mounting unit 102 may include a pedestal 102a and a camber (i.e., a slightly curved surface) 102b.

The pedestal 102a may be made of a material of sufficient flexibility such that the cantilever 116 is permitted to bend slightly when the housing unit 100 is attached to the mounting unit, as described below. The camber 102b may be curved so as to conform to a shape of the instep of the shoe 104 on which it is to be mounted. As shown in FIGS. 1–3, the positioning of the camber 102b about the rounded instep of the shoe 104 and the tension of the shoelace portions 110a–e (when laced tightly) serve to prevent the mounting unit 102 from moving in all six degrees of freedom (i.e., three degrees of translation and three degrees of rotation) with respect to the shoe 104. It should understood, however, that alternative embodiments of the invention may employ mounting units that, when mounted to the shoe 104, have fewer that all six degrees of freedom restricted, and that the invention is not limited to embodiments in which all six degrees of freedom of the mounting device 102 with respect to the shoe 104 are restricted.

As shown in FIGS. 2 and 3, the housing unit 100 may include a tapered groove 302 and the mounting unit 202 may include a tapered tongue 202, which tongue 202 and groove 302 are shaped so as mate with one another when the two units are attached together. An example of a suitable taper in the tongue 202 and groove 302 is illustrated, for example, by the angle $\theta_b$ (see FIG. 6). As shown, the tongue 202 and groove 302 may be tapered a sufficient amount that the housing unit 100 is prevented from being separated vertically from the mounting unit 102 when the two units are attached together.

Also show in FIGS. 2 and 3 are: (1) a ramp 206 on an upper surface 204 of the pedestal 102a, (2) a notch 306 on a lower surface 306 of the housing unit 100, and (3) the curved back end 128 of the housing unit 100. When the housing unit 100 is attached to the mounting unit 102, as described below, the tongue 202 is inserted fully into the groove 302 and a shoulder 208 of the ramp 206 engages an inner wall 308 of the groove 306 so as to prevent the tongue 202 from being removed from the groove 302. The back end 128 is curved inwardly in the embodiment shown so as to permit the back end 128 of the housing unit 100 to wrap slightly around the instep of the shoe 104.

Figure 4:
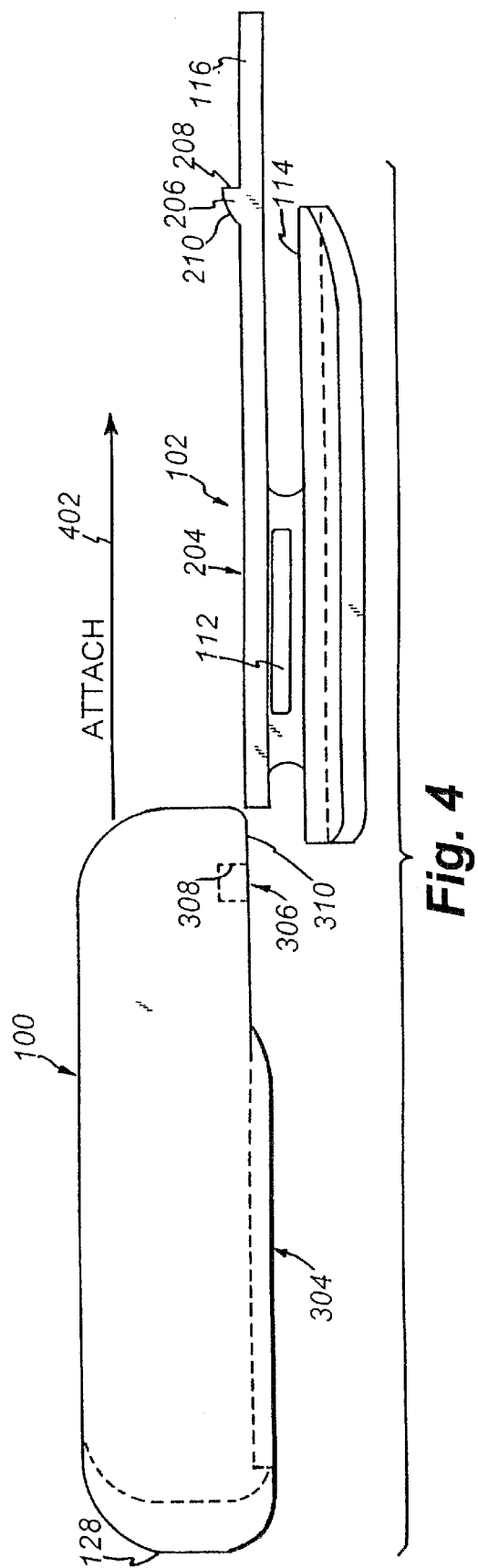
FIG. 4 shows an example of how the two separate units shown in FIGS. 2 and 3 may be releasably attached to one another according to one embodiment.

FIG. 4 shows an example of how the housing unit 100 and the mounting unit 102 of the example embodiment of FIGS. 1–3 may be releasably attached to one another. As shown, the housing unit 100 and the mounting unit 102 may be oriented such that the bottom surface 304 of the housing unit 100 is in approximately the same plane as the top surface 204 of the mounting unit 102, and the housing unit 100 may be slid toward the mounting unit 102 (in a direction indicated by the arrow 402) when the devices are so oriented. The tongue 202 may be slid into the groove 302 until a top section 210 of the ramp 206 contacts a front portion 310 of the bottom surface 304, thereby causing the cantilever 116 to bend slightly toward the attachment member 114. When the cantilever 116 bends downward, the top section 210 of the ramp 206 may be caused to slide across the front portion 310 of the bottom surface 304 until the shoulder 208 of the ramp 206 engages the inner wall 308 of the notch 306.

Figure 5:
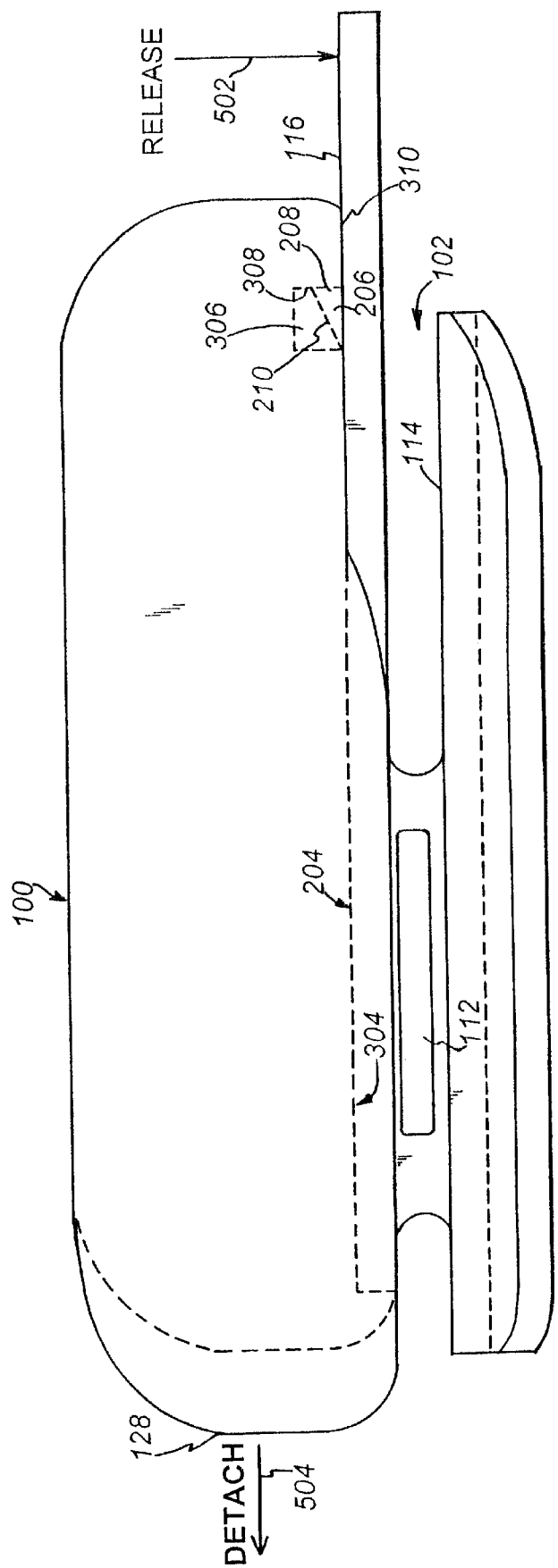
FIG. 5 shows an example of how the two separate units shown in FIGS. 2 and 3 may be detached from one another after having been attached together.
Figure 6:
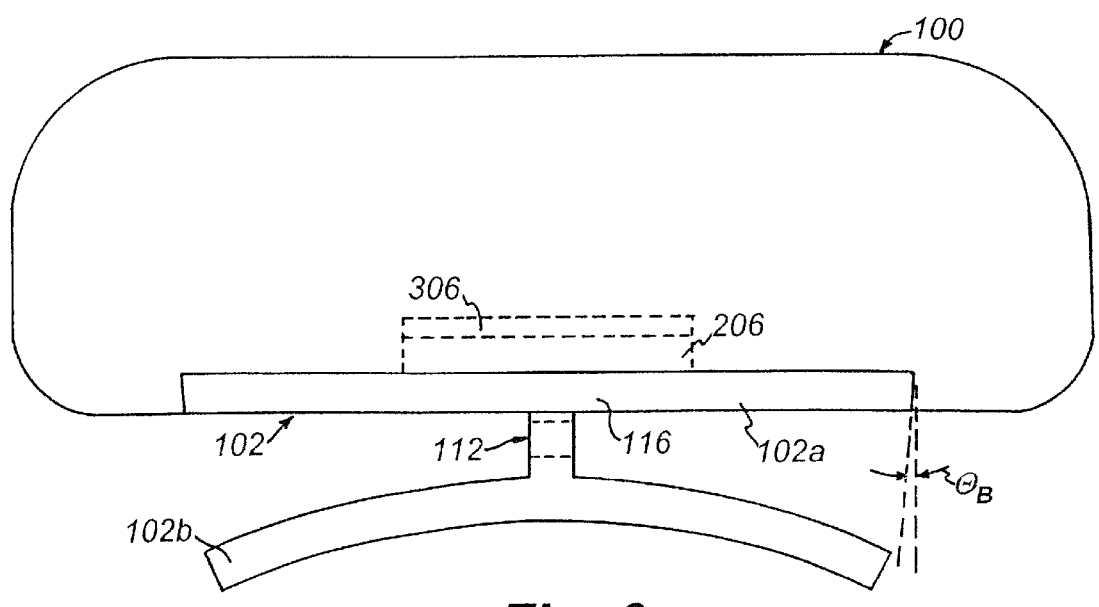
FIG. 6 shows a front view of the example embodiment of the invention shown in FIGS. 1–5.

When the housing unit 100 and the mounting unit 102 are attached together as shown in FIGS. 5 and 6, the engagement of the shoulder 208 with the inner wall 308, in addition to the engagement of the tapered tongue 202 within the tapered groove 302, prevents the housing unit 100 from moving with respect to the mounting unit 102 in all six degrees of freedom. It should appreciated, however, that alternative embodiments of the invention may employ housing units and mounting units that, when attached together, restrict fewer that all six degrees of freedom of the housing units with respect to the mounting units, and that the invention is not limited to embodiments in which all six degrees of freedom are restricted.

FIG. 5 shows an example of how the housing unit 100 and the mounting unit 102 of the example embodiment shown in FIGS. 1–3 may be disengaged from one another. As shown, the user may push the cantilever 116 toward the attachment member 114 of the mounting unit 102 (as indicated by the arrow 502) such that the shoulder 208 of the ramp 206 is disengaged from the inner wall 308 of the notch 306, and the housing unit 100 may simultaneously be slid away from the mounting unit 102 (in a direction indicated by the arrow 504) so that the upper surface 210 of the ramp 206 slides a slight distance across the front portion 310 of the bottom surface 304 of the housing unit 100. In this manner, the tongue 202 of the mounting unit 102 may be completely removed from the groove 302 of the housing unit 100, and the two devices may be separated from one another.

FIG. 6 shows a front view of the example shoe-mount device shown in FIGS. 1–5 when the housing unit 100 is attached to the mounting unit 102. FIG. 6 illustrates, among other things, the curved surface of the camber 102b that may mate with the instep of the shoe 104, and the tapering of the tongue 202 and the groove 302 at the angle $\theta_b$, which prevents the housing unit 100 from being separated vertically from the mounting unit 102 when these two units are attached together.

Figure 7:
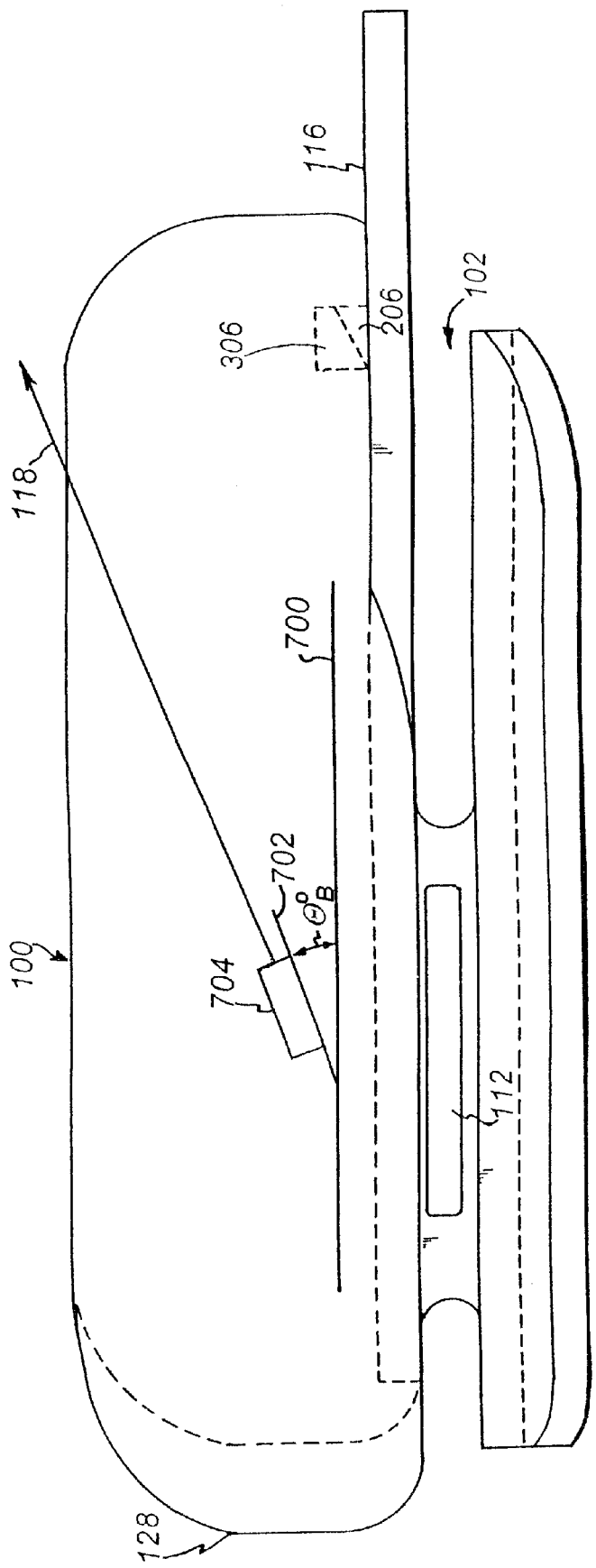
FIG. 7 shows an example of how an accelerometer may be mounted at an acute angle with respect to a plane of a circuit board according to one embodiment of the invention.

FIG. 7 shows an example of how an accelerometer 704 may be mounted with respect to he housing unit 100 such that the acceleration-sensing axis 118 of the accelerometer 704 forms an acute angle $\theta_a$ with respect to a plane of the housing unit. In the FIG. 7 example, the accelerometer 704 is mounted on an mounting device 702, which is secured to a circuit board 700 such that an acute angle $\theta_a$ is formed between a plane of the mounting device 702 and a plane of the circuit board 700. Alternatively, the accelerometer 704 may be mounted flush with the circuit board 700, and the circuit board 700 may itself be oriented at an acute angle $\theta_a$ with respect to the plane of the housing unit 100. As mentioned above, this orientation of the acceleration-sensing axis 118 at an acute angle with respect to the plane of the housing unit 100 permits the housing unit 100 to be secured to the instep of the shoe 104, with the acceleration-sensing axis 118 being oriented substantially parallel with the ground when the shoe is flush on the ground.

It should be appreciated that, in some embodiments wherein an accelerometer is used to measure the impact of the shoe 104 with the ground, the accelerometer 704 may be oriented within the mounting unit 100 such that the acceleration-sensing axis 118 forms an acute angle with respect to the plane of the mounting unit and/or the plane of the circuit board 700, and is oriented perpendicular to the ground when the shoe 104 is flat on the ground.

Figure 8:
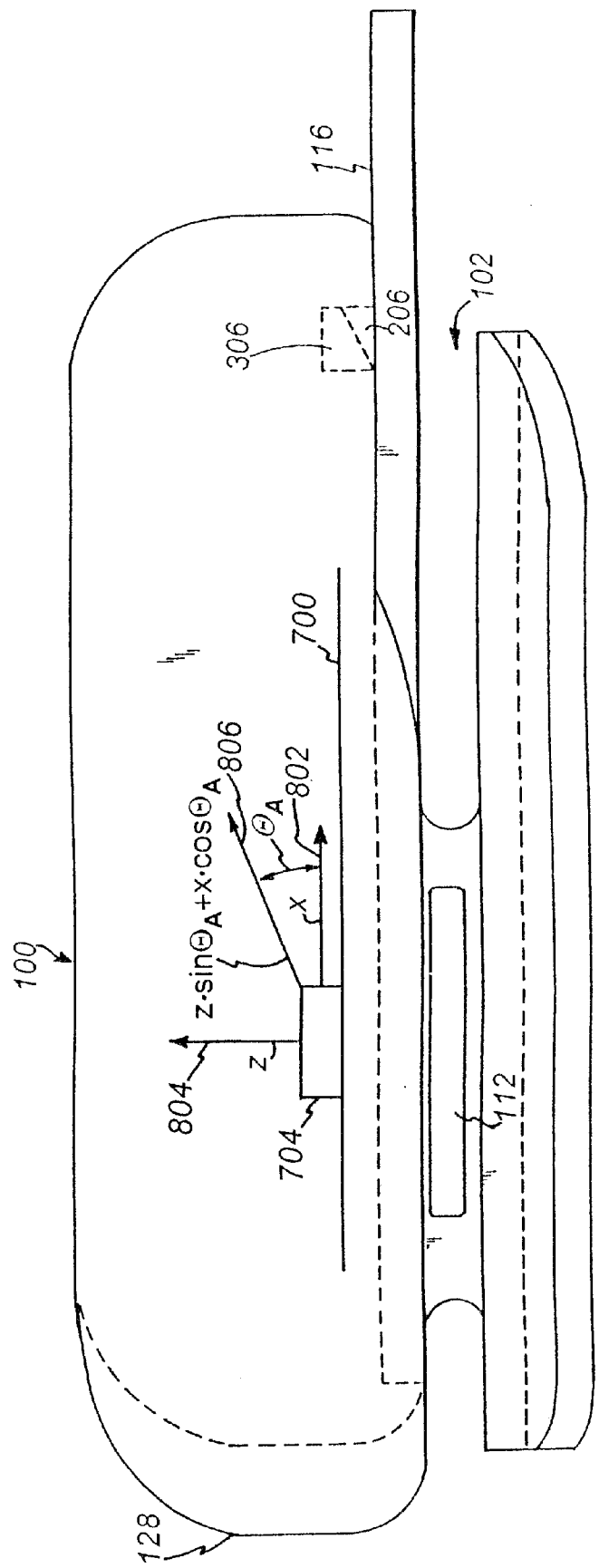
FIG. 8 shows an example of how an accelerometer having two perpendicular acceleration-sensing axes may be used to sense acceleration in a direction other than the directions in which the two acceleration-sensing axes are oriented.

FIG. 8 shows an example of how an accelerometer having at least two orthogonal acceleration-sensing axes may be used to measure the acceleration in a direction other than the directions in which the acceleration-sensing axes are oriented. As shown, the accelerometer 704 may be mounted flush on the circuit board 700, which circuit board 700 is oriented parallel to a plane of the housing unit 100. In the embodiment shown, components of both an "x" acceleration-sensing axis 802 and a "z" acceleration-sensing axis 804 are combined using a trigonometric function ($z*\sin(\theta_a)+x*\cos(\theta_a)$) in order to sense the acceleration in the direction indicated by the arrow 806, which extends at an acute angle $\theta_a$ with respect to the "x" acceleration-sensing axis 802. It should be appreciated that the trigonometric function used in the FIG. 8 embodiment is only one example of an equation that may be used to combine the components of two acceleration-sensing axes according to this aspect of the invention, and that the invention is not limited to the use of the particular equation shown. In one embodiment, for example, the components of the "x" and "z" acceleration-sensing axes 802 and 804 are merely added together without using a trigonometric function to weigh the contribution of each.

Having described at least one embodiment in detail, various modifications and improvements will readily occur to those skilled in the art. Such modifications and improvements are intended to be within the spirit and scope of the invention. Accordingly, the foregoing description is by way of example only, and is not intended to be limiting.

What is claimed is:

1. An apparatus for monitoring locomotion of a person that can be secured to the person's shoe, comprising:

a mounting unit adapted to be secured to an outer surface of the shoe;

a housing unit adapted to releasably attach to the mounting unit; and a motion-sensing device attached to the housing unit such that, when the housing unit is detached from the mounting unit, the motion-sensing device remains attached to the housing unit.

2. The apparatus as claimed in claim 1, wherein the motion-sensing device is contained within the housing unit.

3. The device as claimed in claim 1, wherein the mounting unit is constructed and arranged to be secured to the shoe using a shoelace of the shoe.

4. The device as claimed in claim 3, wherein the mounting unit includes means forming an opening through which the shoelace can pass to secure the mounting unit to the shoe.

5. The device as claimed in claim 3, wherein the mounting unit includes means for securing the mounting unit to the shoelace of the shoe.

6. The device as claimed in claim 3, wherein the mounting unit is constructed and arranged to be secured to an instep portion of the shoe.

7. The device as claimed in claim 1, wherein the mounting unit includes a curved lower surface that is shaped to conform to an instep portion of the shoe.

8. The device as claimed in claim 1, wherein the mounting unit does not include any electronic components.

9. The device as claimed in claim 1, wherein the motion-sensing device is included in the housing unit and the housing unit is self-contained.

10. The device as claimed in claim 1, wherein the mounting unit is adapted to be removably secured to the outer surface of the shoe.

11. A motion-sensing apparatus, comprising:

a circuit board having a substantially planar surface; and an accelerometer, having at least one acceleration-sensing axis, mounted on the circuit board such that the at least one acceleration-sensing axis is oriented at an acute angle with respect to the surface of the circuit board.

12. A method for mounting a motion-sensing device to a person's shoe, comprising steps of:

securing a mounting unit to an outer surface of the shoe;

attaching a housing unit, having a motion-sensing device attached thereto, to the mounting unit; and detaching the housing unit from the mounting unit without detaching the motion-sensing device from the housing unit.

13. The method as claimed in claim 12, further including a step of mounting the motion-sensing device within the housing unit such that the housing unit is self-contained.

14. The method as claimed in claim 12, wherein the step of securing the mounting unit to the outer surface of the shoe includes a step of using a shoelace of the shoe to secure the mounting unit to the shoe.

15. The method as claimed in claim 12, further including a step of removing the mounting unit from the shoe.

16. A method for mounting an accelerometer on a circuit board, comprising a step of:

mounting the accelerometer on the circuit board such that at least one acceleration-sensing axis of the accelerometer is oriented at an acute angle with respect to a surface of the circuit board.

* * * * *

UNITED STATES PATENT AND TRADEMARK OFFICE
CERTIFICATE OF CORRECTION

PATENT NO. : 6,122,340 Page 1 of 1
APPLICATION NO. : 09/164654
DATED : September 19, 2000
INVENTOR(S) : Jesse Darley et al.

It is certified that error appears in the above-identified patent and that said Letters Patent is hereby corrected as shown below:

In Column 10, Claim 4, Line 9:
Please delete "means forming" and insert --means for forming--.

Signed and Sealed this

Thirteenth Day of October, 2009

David J. Kappos
*Director of the United States Patent and Trademark Office*